US012767473B2

(12) United States Patent
Liimatta et al.

(10) Patent No.: US 12,767,473 B2
(45) Date of Patent: Oct. 20, 2026

(54) ROLL HANDLING ASSEMBLY AND METHOD

(71) Applicant: BW Converting, Inc., Green Bay, WI (US)

(72) Inventors: Jacob Liimatta, De Pere, WI (US); Jonathon T. Zahn, Green Bay, WI (US); Cory L. Schubring, De Pere, WI (US)

(73) Assignee: BW Converting, Inc., Green Bay, WI (US)

( * ) Notice: Subject to any disclaimer, the term of this patent is extended or adjusted under 35 U.S.C. 154(b) by 184 days.

(21) Appl. No.: 18/653,514

(22) Filed: May 2, 2024

(65) Prior Publication Data

US 2024/0391721 A1 Nov. 28, 2024

Related U.S. Application Data

(60) Provisional application No. 63/468,563, filed on May 24, 2023.

(51) Int. Cl.
*B65H 19/12* (2006.01)
*B31F 1/07* (2006.01)
*B41F 13/00* (2006.01)

(52) U.S. Cl.
CPC ............... *B65H 19/12* (2013.01); *B31F 1/07* (2013.01); *B31F 2201/0776* (2013.01);
(Continued)

(58) Field of Classification Search
CPC ........ B65H 19/00; B65H 19/10; B65H 19/12; B65H 19/123; B65H 19/126; B65H 19/30;
(Continued)

(56) References Cited

U.S. PATENT DOCUMENTS 1,591,597 A * 7/1926 Williamson ......... B65H 19/126 242/555.3
RE20,912 E * 11/1938 White ................ B65H 19/1868 242/559.2
(Continued)

FOREIGN PATENT DOCUMENTS

CH 578983 A5 8/1976
CN 111099410 A * 5/2020 ............. B65H 19/12
(Continued)

*Primary Examiner* — Fadey S. Jabr
*Assistant Examiner* — Raveen J Dias
(74) *Attorney, Agent, or Firm* — Thompson Coburn LLP

(57) ABSTRACT

An assembly handles a roll used on a machine in a converting line. A storage assembly has a storage structure that extends above the machine that uses the roll. The storage assembly has a rack for supporting the roll in the storage structure. The rack has a roll mover configured to move horizontally between a stored position and an extended position. A transfer assembly has first and second supports on laterally opposite sides of the converting line. The first and second supports are adjacent to and extending above the machine. The transfer assembly has a lifter that is operatively connected to and supported by the first and second supports. The lifter is configured to move vertically relative to the first and second supports between the storage assembly and the machine. The transfer assembly is configured to transfer the roll between the rack in the storage structure and the machine.

19 Claims, 6 Drawing Sheets

(52) U.S. Cl.
CPC ... *B31F 2201/0782* (2013.01); *B41F 13/0016* (2013.01); *B65H 2301/4135* (2013.01); *B65H 2301/41732* (2013.01); *B65H 2405/422* (2013.01); *B65H 2405/43* (2013.01)

(58) Field of Classification Search
CPC ...... B65H 16/02; B65H 16/021; B65H 16/04; B65H 16/06; B65H 2405/40; B65H 2405/42; B65H 2405/422; B65H 2405/423; B65H 2405/43; B65H 2405/44; B65H 2301/4132; B65H 2301/41324; B65H 2301/413246; B65H 2301/4134; B65H 2301/41342; B65H 2301/41344; B65H 2301/4135; B65H 2301/41352; B65H 2301/413526; B65H 2301/4139; B65H 2301/41394; B65H 2301/41398; B65H 2301/4171; B65H 2301/4172; B65H 2301/41724; B65H 2301/4173; B65H 2301/41732; B65H 2301/41734; B31F 1/07; B31F 2201/00; B31F 2201/0741; B31F 2201/0753; B31F 2201/0771; B31F 2201/0776; B31F 2201/0782; B31F 2201/0784; B31F 13/0016; B41F 13/0016; B41F 13/0024
USPC ..... 242/558, 559, 559.4, 560; 156/553, 586; 162/283, 362
See application file for complete search history.

(56) References Cited

U.S. PATENT DOCUMENTS

| | | | | | |
|---|---|---|---|---|---|
| 3,598,041 | A * | 8/1971 | De Noyer | D21G 1/00 | 100/163 A |
| 4,510,783 | A * | 4/1985 | Rommen | B21B 31/103 | 72/200 |
| 4,682,929 | A * | 7/1987 | Kataoka | B65H 19/30 | 242/533.3 |
| 4,941,607 | A | 7/1990 | Schlunke | | |
| 5,007,522 | A * | 4/1991 | Focke | B65H 19/123 | 198/465.4 |
| 5,205,505 | A * | 4/1993 | Focke | B65B 41/12 | 242/559.3 |
| 5,249,757 | A * | 10/1993 | Draghetti | B65H 19/123 | 242/559.1 |
| 5,620,151 | A * | 4/1997 | Ueyama | B65H 19/30 | 242/533.8 |
| 5,975,457 | A * | 11/1999 | Forbes | B65H 19/1873 | 242/555.2 |
| 6,042,047 | A * | 3/2000 | Thievessen | B65H 16/06 | 242/399.1 |
| 6,688,366 | B1 | 2/2004 | Gambini | | |
| 7,546,971 | B2 * | 6/2009 | Pappas | B65H 19/123 | 242/533.7 |
| 8,381,646 | B2 | 2/2013 | Catelli | | |
| 10,220,591 | B2 | 3/2019 | Montagnani et al. | | |
| 10,683,183 | B2 | 6/2020 | Perini et al. | | |
| 10,730,274 | B2 | 8/2020 | Gussert et al. | | |
| 11,946,202 | B2 * | 4/2024 | Giurlani | D21G 1/0293 | |
| 12,031,272 | B2 * | 7/2024 | Giurlani | B29C 33/026 | |
| 2004/0206848 | A1 * | 10/2004 | Martinez | B65H 19/126 | 242/559.4 |
| 2005/0189448 | A1 * | 9/2005 | Schmidt-Hebbel | B65H 67/0417 | 242/533.1 |
| 2006/0157610 | A1 * | 7/2006 | Rann | B65H 19/126 | 242/560 |
| 2006/0169826 | A1 * | 8/2006 | Benvenuti | B65H 19/12 | 242/555 |
| 2006/0175457 | A1 * | 8/2006 | Benvenuti | B65H 19/126 | 242/555 |
| 2009/0065626 | A1 * | 3/2009 | Petri | B65H 16/106 | 242/558 |
| 2009/0114757 | A1 * | 5/2009 | Petri | B65H 19/1836 | 242/554.2 |
| 2011/0274527 | A1 * | 11/2011 | Cavirani | B65H 19/12 | 414/806 |
| 2017/0028666 | A1 | 2/2017 | Montagnani et al. | | |
| 2017/0152120 | A1 * | 6/2017 | Montoya | B65H 23/0326 | |
| 2018/0178498 | A1 * | 6/2018 | Gussert | B32B 37/0053 | |
| 2019/0071272 | A1 * | 3/2019 | Perini | B65H 19/12 | |
| 2019/0111651 | A1 * | 4/2019 | Paolinelli | B31F 1/07 | |
| 2019/0193367 | A1 * | 6/2019 | Dettori | B31F 1/07 | |
| 2020/0370219 | A1 * | 11/2020 | Myers | D05B 11/00 | |
| 2021/0291477 | A1 | 9/2021 | Dettori et al. | | |
| 2021/0339974 | A1 * | 11/2021 | Baldaccini | B65H 19/2253 | |
| 2021/0354944 | A1 * | 11/2021 | Kambara | B65H 19/126 | |
| 2022/0127094 | A1 * | 4/2022 | Morelli | B65H 19/126 | |
| 2022/0289508 | A1 * | 9/2022 | Tsai | B65H 19/2238 | |
| 2022/0314571 | A1 | 10/2022 | Buffa et al. | | |
| 2024/0101383 | A1 * | 3/2024 | Perini | B65H 19/123 | |
| 2024/0239626 | A1 * | 7/2024 | Jaquet | B65H 19/126 | |

FOREIGN PATENT DOCUMENTS

| | | | | |
|---|---|---|---|---|
| DE | 4141216 | A1 * | 6/1992 | B66C 1/62 |
| DE | 4131481 | A1 | 3/1993 | |
| EP | 3272512 | A1 | 1/2018 | |
| IT | 20120070 | A1 | 10/2013 | |
| JP | H0395003 | A * | 4/1991 | B65H 19/12 |
| WO | 2018036793 | A1 | 3/2018 | |

* cited by examiner

ROLL HANDLING ASSEMBLY AND METHOD

RELATED APPLICATION DATA

This application claims priority benefit of U.S. provisional application Ser. No. 63/468,563, filed May 24, 2023, the disclosure of which is incorporated by reference herein.

BACKGROUND AND SUMMARY

The disclosure is directed to a roll handling assembly and a method for handling a roll used on a machine in a converting line. In particular, the disclosure is directed to a roll handling assembly that allows the transfer of rolls used on an embossing and/or lamination machine, for instance, embossing rolls, anvil rolls, rubber rolls, adhesive rolls (applicator rolls and gravure/anilox rolls), and/or marrying rolls, between the machine and a storage assembly. More in particular, the disclosure is directed to a roll handling assembly that includes a storage assembly positioned vertically above the machine of the converting line that uses the roll, and a transfer assembly that is configured to move a desired roll between the storage assembly and the machine.

DETAILED DESCRIPTION

Figure 1:
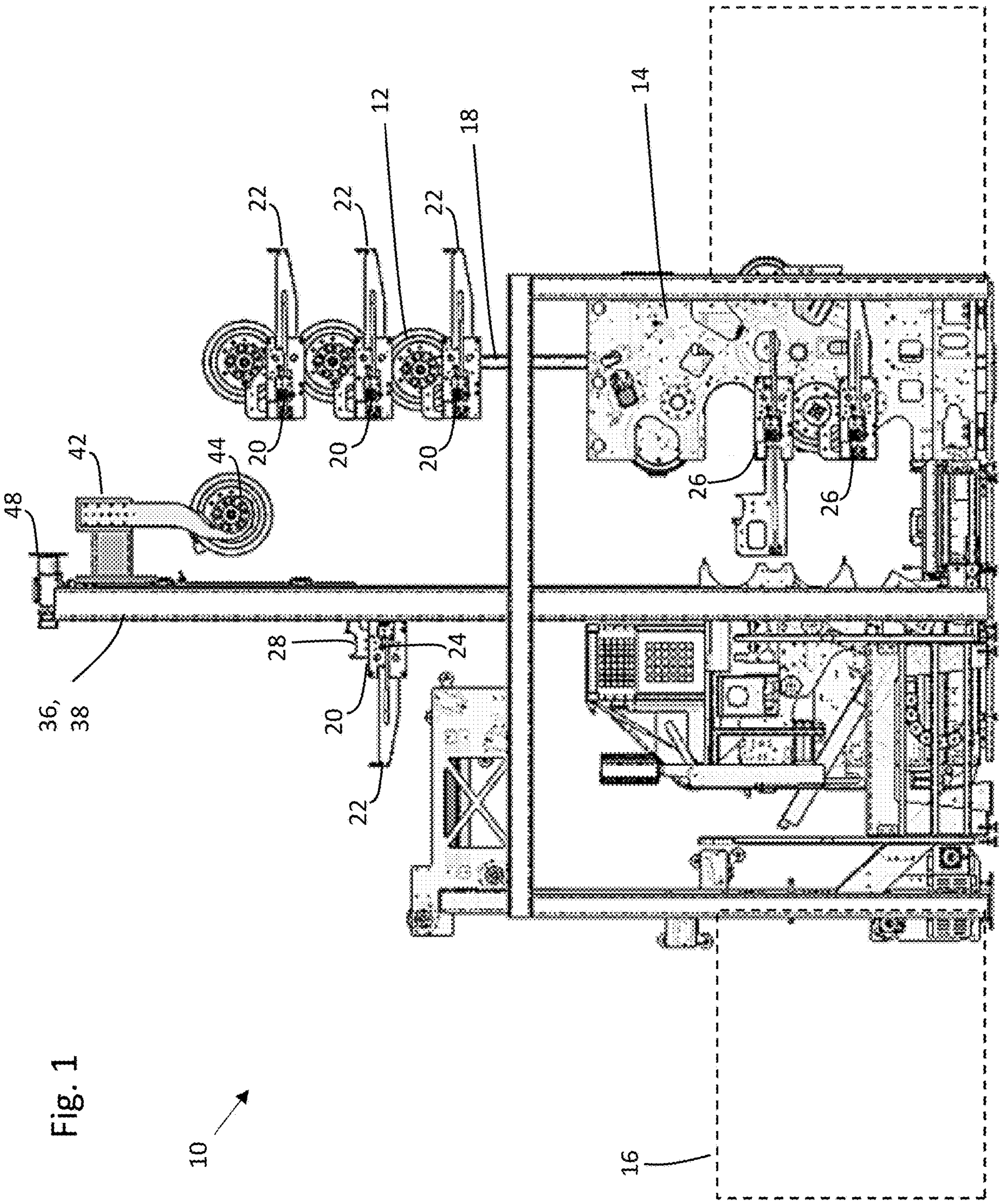
FIG. 1 is an operator side view of an exemplary machine of a converting line, that is, a laminating and embossing machine, with an exemplary roll handling assembly adjacent thereto, with the laminating and embossing machine shown separated to allow the roll handling assembly access to an embossing roll to be removed from the machine.
Figure 2:
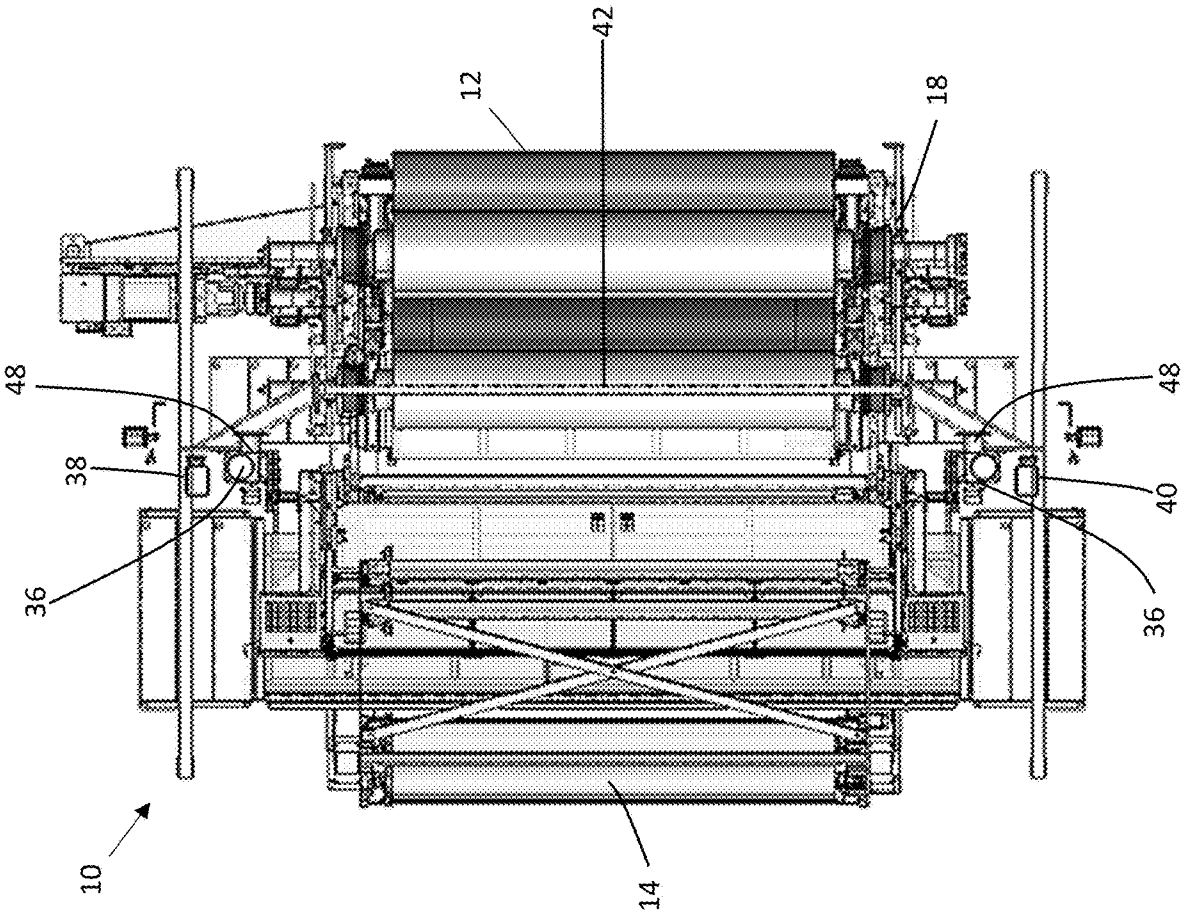
FIG. 2 is a top plan view of the laminating and embossing machine and roll handling assembly of FIG. 1.
Figure 3:
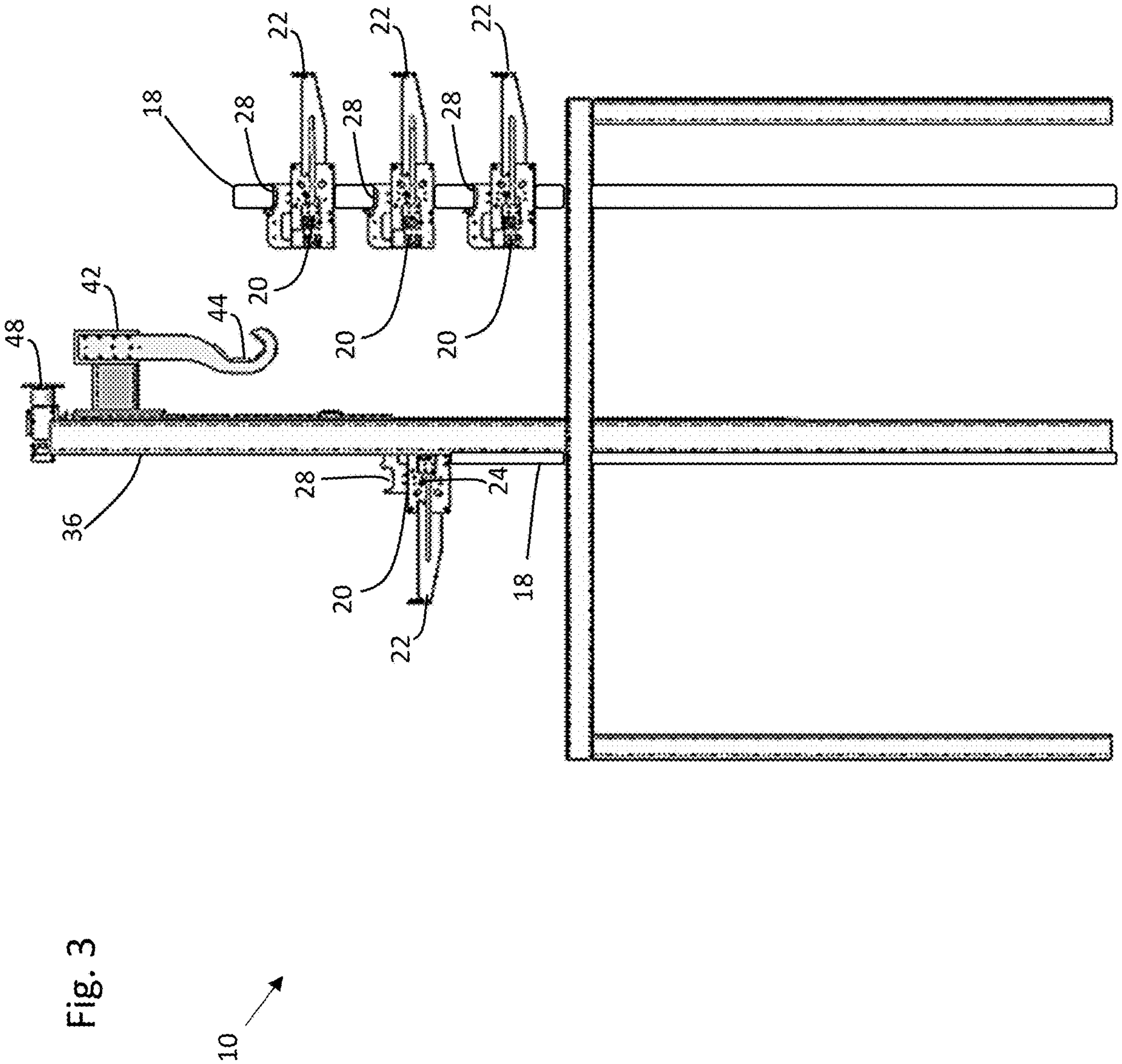
FIG. 3 is a side view of the roll handling assembly with the machine and rolls removed to provide additional detail of the roll handling assembly.
Figure 4:
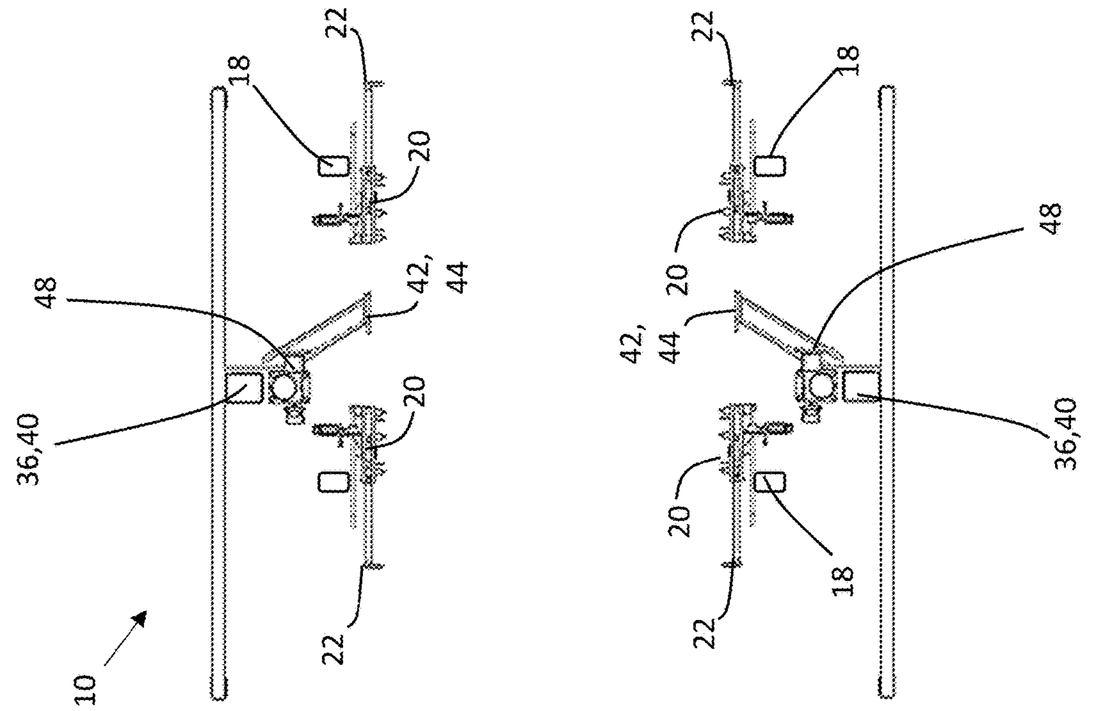
FIG. 4 is a top plan view of the roll handling assembly of FIG. 3.
Figure 5:
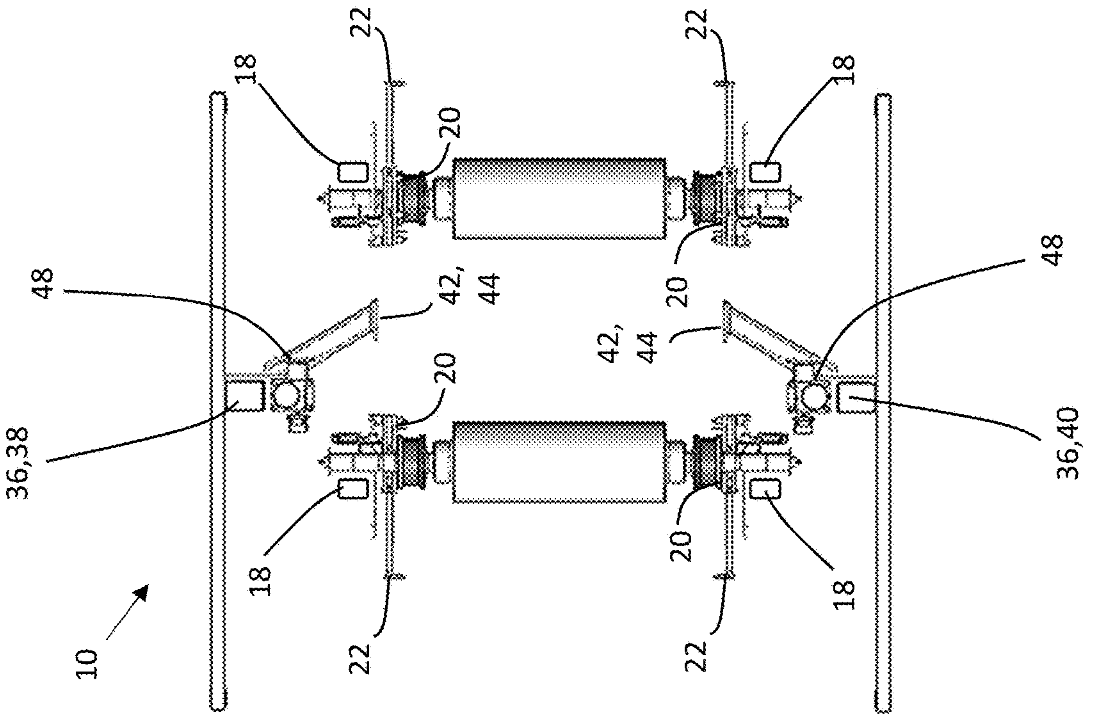
FIG. 5 is a top plan view of the roll handling assembly of FIG. 3 with the rolls shown for additional detail.
Figure 6:
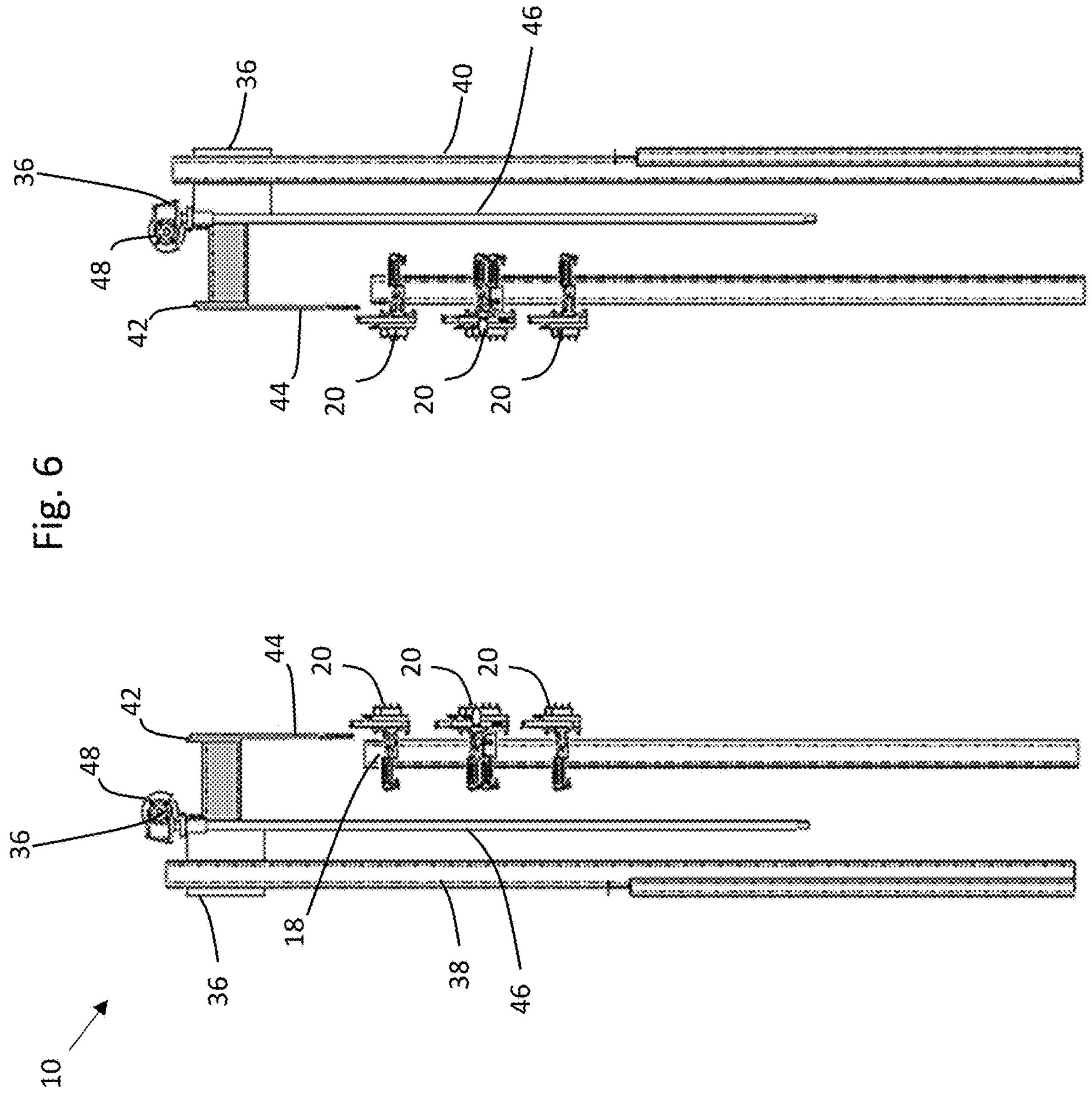
FIG. 6 is an upstream end view of the roll handling assembly of FIG. 3.
Figure 7:
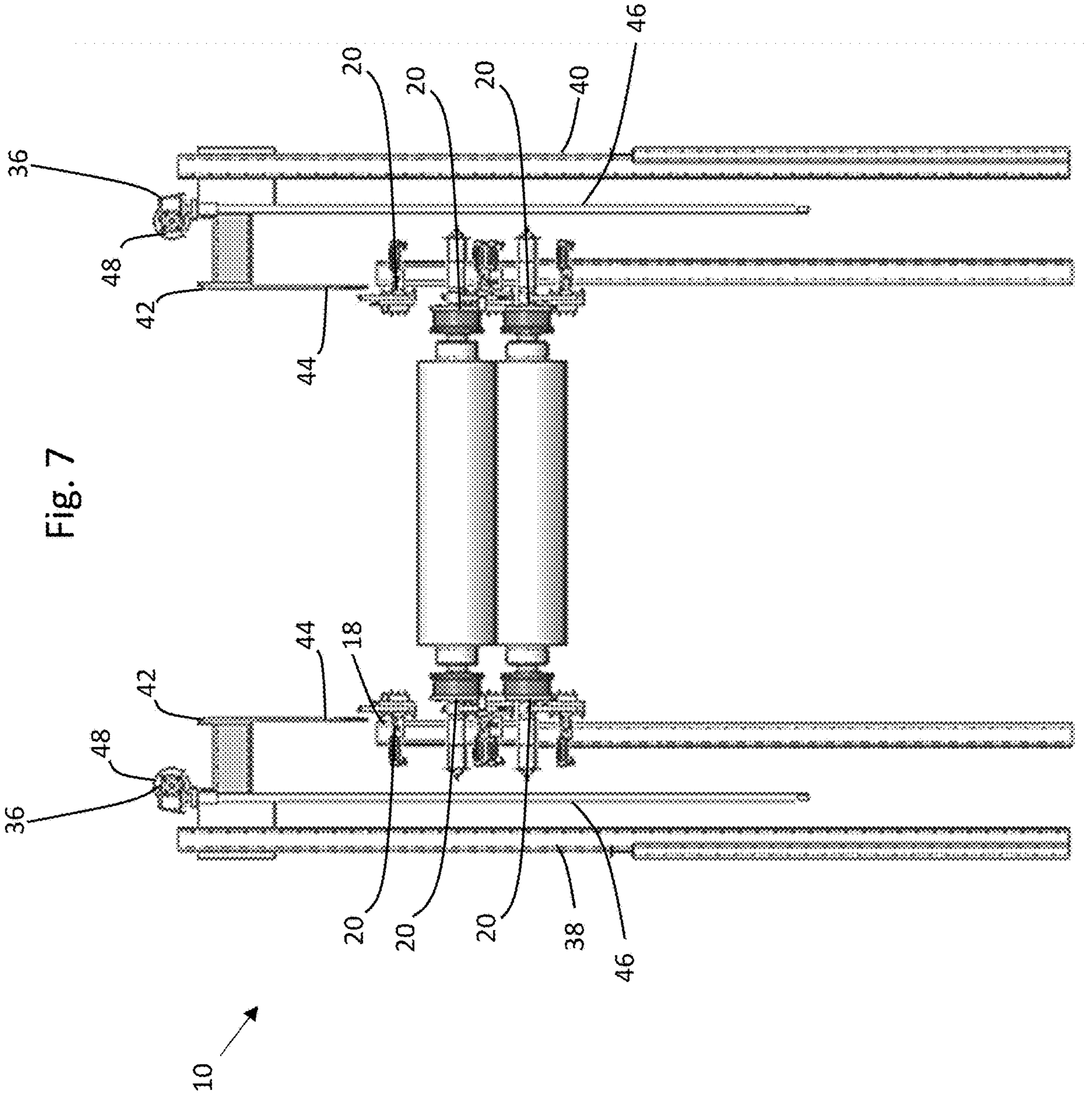
FIG. 7 is an upstream end view of the roll handling assembly of FIG. 3 with the rolls shown for additional detail.

FIGS. 1-2 provide an exemplary implementation of the roll handling assembly 10 for handling one or more rolls 12 used on a machine 14 in a converting line 16. In the exemplary implementation shown in the FIGS. 1-2, the roll handling assembly 10 includes a storage assembly 18 for storing the one or more rolls 12 used on an embossing laminator machine (LEM) 14. The LEM may be of the type set forth in U.S. Pat. No. 10,730,274. In particular, the roll handling machine 10 allows for automated changing of steel embossing rolls and storage of additional steel embossing rolls used in the embosser/laminator. The roll handling assembly may also be used for other rolls of the embosser/laminator, including anvil rolls, rubber rolls, adhesive rolls, and/or marrying rolls. As will become evident from the discussion that follows, the roll handling assembly 10 reduces the amount of operator intervention necessary to change and store rolls for the machine, and reduces change-over time, while protecting the rolls from dust, debris and glue common to the embossing lamination process.

FIGS. 3-7 provide additional detail of the roll handling assembly 10 with the machine removed for ease of illustration. The storage assembly 18 of the roll handling assembly 10 includes a structural framework that extends vertically above and on lateral sides of the machine 14, for instance, the LEM. The structural framework includes vertical columns arranged outboard of the machine 14 on lateral sides of the converting line 16. The columns may be supported by struts and gussets as needed. The storage assembly 18 includes at least one rack 20 that is adapted and configured to support the roll to be used in the machine. The rack 20 is supported by and integral with the storage structure. In the example shown, the rack 20 comprises mounts in the support structure that allow for supporting the roll. Accordingly, the rack 20 extends in the cross machine direction over the top of the machine and stores the roll 12 in an orientation in which the roll is used in the machine. Thus, the lateral footprint of the handling assembly is reduced and simple two axis motion vertically and in the machine direction is needed to transfer a roll between the storage assembly and the machine. Preferably, a plurality of racks 20 are provided in the storage assembly 18 to accommodate multiple types of rolls, for instance, different pattern embossing rolls, to be used in the machine. The racks 20 may be arranged vertically relative to one another and/or may be arranged horizontally relative to another rack. In arranging the racks in a horizontal configuration, one rack may be vertically offset from a horizontally adjacent rack. The support structure of the storage assembly 18 is preferably independent of the machine. This allows the support structure to be installed over and around the machine, for instance, in retrofitting the roll handling assembly in an existing machine installation application.

The storage assembly 18 further includes at least one roll mover 22 for each rack 20. The roll mover 22 is adapted and configured to move horizontally in the machine direction between a stored position and an extended position. The roll mover 22 may comprise an actuator 24 to move the roll mover horizontally between the stored and extended positions. The actuator 24 may be, for instance, a screw jack actuator provided by Joyce model WJ1000U4S-29-STDX-STDX-X, or a similar type of actuator known in the art capable of moving the roll between the storage position and the extended position. Preferably, two roll movers 22 are provided for each rack 20; one for each axial end of the roll stored in the rack. Preferably, the roll mover 22 is similar to the roll extractor 26 used in the machine 14 so as to simplify the construction and number of parts, and to allow the same surfaces of the roll 12 to be engaged by the roll mover 22 during storage and by the roll extractor 26 during machine operation. To that end, the roll mover 22 may have an end effector 28 adapted and configured to engage an axial end of the roll to be stored in the storage structure. The end effector 28 may have any configuration necessary to engage the roll and hold the roll in place while the actuator 24 moves the roll mover 22 between the storage position and the extended position. The end effector 28 may also engage surfaces on the axial ends of the roll used to rotate and drive the roll during normal operations of the machine. The end effector may also engage the operating surface of the roll. The end effector can be advantageously shaped in order to move the roll with repeatability to the desired positions for transfer to and from the rack.

The roll handling assembly 10 further includes a transfer assembly 36 that is adapted and configured to move the roll between the storage assembly and the machine. The transfer assembly 36 includes first and second vertical supports 38,40 on laterally opposite sides of the converting line 16. The first and second vertical supports 38,40 are adjacent to and extend above the machine 14 that uses the roll. The first and second vertical supports 38,40 are preferably independent of the structure of the machine 14 so as to allow the first and second vertical supports to be installed over and around the machine, for instance, in a retrofitting application. The first and second vertical supports may be connected with the support structure of the storage assembly or may be independent therefrom.

The transfer assembly 36 further includes a lifter 42 operatively connected to and supported by the first and second vertical supports. The lifter 42 is adapted and configured to move vertically relative to the first and second vertical supports 38,40 between the storage assembly 18 and the machine 14. The lifter 42 may comprise a pair of journal cradles 44 that are positioned vertically by a pair of ball or acme lead screws 46 driven with a servo motor 48. The lifter 42 may comprise a first cradle associated with the first vertical support 38, and a second cradle associated with the second vertical support 40. The ball or acme lead screw 46 for effecting vertical movement of the lifter may be driven by a servo motor 48 mounted on the top vertical end of the respective vertical support 38,40. The lifter 42 may be configured to engage axial ends of the roll. For instance, each cradle 44 of the lifter 42 may be configured as necessary to engage an axial end of the roll. The cradle may comprise a hook shape so that vertical movement of the lifter may enable the cradle to engage and disengage from the axial end of the roll. The lifter 42 is configured for movement in a vertical axis or plane relative to the first and second vertical supports 38,40. The path of motion of the lifter 42 intersects that of the roll mover 22 so as to allow transfer of the roll 12 between the lifter 42 and the roll mover 22, when the roll mover moves horizontally from the storage position to the extended position. In one aspect, the cradle 44 associated with each vertical support 38,40 may have a hook shape and may be positioned laterally outboard of the roll mover 22 in the extend position (see, e.g. FIGS. 6-7). So, when the lifter 42 moves vertically upward, the cradles 44 may engage the ends of the roll 12 and move the roll vertically upward and off the extended roll mover 22, and when the lifter moves vertically downward, the cradles may disengage from the ends of the roll and leave the roll on the extended roll mover.

The method of handling the roll 12 used in the machine 14 in the converting line 16 will next be described. To install a new roll 12 in a vacant location in the machine 14, the lifter 42 may be moved on the first and second vertical supports 38,40 vertically so as to position the lifter adjacent to the rack 20 of the storage assembly 18. The rack 20 may store a selected roll 12 to be used in the machine 14. The lifter 42 may have a home position within the storage assembly 18 or a home position in an intermediate location between the storage assembly and the machine 14. So, depending on the home position, the lifter 42 may move vertically upward or downward to be adjacent the selected roll and rack 20. In one aspect, the lifter 42 may first be positioned below the rack 20 to allow clearance for the roll 12 and roll mover 22 as they move to the extended position. Thus, once the roll mover 22 moves to the extended position, the lifter may move vertically upward to engage the roll and move the roll off the roll mover. The roll mover 22 of the rack 20 may move horizontally from the storage position to the extended position. Then the roll may be transferred from the roll mover 22 to the lifter 42. Once the roll has been transferred to the lifter, the roll mover 22 may be moved from the extended position to the storage position. The lifter may then move from the storage assembly 18 to the machine 14, and the roll 12 may be transferred from the lifter to the machine.

For illustration and not in any limiting sense, transfer from the lifter 42 to the machine 14 will be described with reference to the machine described in U.S. Pat. No. 10,730,274 as follows: (i) the adhesive unit/sub-frame is moved to the disengaged position to create a space between the mainframe and the adhesive unit/subframe; (ii) the extractor 26 moves to the exchange position in the space between the spaced away mainframe and adhesive unit/subframe; (iii) the lifter 42 lowers the roll 12 on to the extractor 26 and continues downward motion to disengage the lifter from the roll and leave the roll on the extractor; (iv) the extractor 26 moves to the normal operating position; (v) the lifter 42 moves vertically upward to leave the space between the mainframe and the adhesive unit/subframe; (vi) the adhesive unit/sub-frame is moved to the engaged position with the mainframe; and (vii) the machine 14 is returned to production.

For illustration and not in any limiting sense, transfer from the machine to the lifter will be described with reference to the machine described in U.S. Pat. No. 10,730,274 as follows: (i) the machine stops; (ii) the adhesive unit/subframe is moved to the disengaged position away from the mainframe; (iii) the lifter 42 moves vertically downward in the space between the mainframe and the adhesive unit/subframe to a position below the extractor 26 so as to provide clearance for the roll and extractor as they move to the exchange position; (iv) the extractor 26 moves the roll 12 from the normal operating position to the exchange position; (v) the lifter 42 moves vertically upward, engages the roll and separates the roll from the extractor 26; and (vi) the lifter continues to move vertically upward to the storage assembly 18.

Once in the storage assembly 18, the lifter 42 moves adjacent to the selected rack 20 which is to receive the preceding roll. In one aspect, the lifter 42 moves to a position above the roll mover 22 to provide clearance for the roll mover as it moves to the extended position. The roll mover 22 moves horizontally from the storage position to the extended position. The lifter 42 transfers the preceding roll from the lifter to the roll mover 22. In one aspect, once the roll mover 22 is in the extended position, the lifter may move from its upward staging location downward to place the roll on the extended roll mover. The lifter may continue downward motion to disengage the lifter from the roll. With the lifter 42 disengaged from the roll, the roll mover may move from the extended position to the storage position.

In a preferred embodiment, there is one more rack in the storage assembly 18 than the number of rolls to be stored in the storage assembly. In the example shown in FIG. 1, four racks 20 are provided so that three rolls may be stored in the storage assembly. The extra rack serves as a staging position. In the example shown in FIG. 1, the staging position is shown spaced horizontally from the storage assembly. The staging position may instead be located within the storage assembly, with a disadvantage that this would add extra height to the assembly. The horizontally spaced position is preferred as a staging position rather than a storage position since a roll stored there would generally be located above an operator access platform. When a roll change is performed, the preceding roll is moved from the LEM to the staging position rack. Then, a new roll is moved from a storage position rack to the LEM. Finally, the preceding roll is moved from the staging position rack to the storage position rack vacated by the new roll.

In an alternate embodiment, the racks in the storage assembly are staggered vertically and/or horizontally. In this embodiment, roll movers with horizontal strokes of different lengths may be provided as needed to reach the roll lifter.

In an alternate embodiment, the lifter may be provided with roll movers. In this embodiment, the LEM may still be provided with roll movers, but the storage assembly may not be provided with roll movers. The roll movers provided on the lifter may be spaced axially from the roll movers in the LEM to allow rolls to be exchanged between the LEM and the lifter as described above. The horizontal movement of the rolls into the storage assembly would be provided by the lifter. This embodiment may provide a more complex and higher cost roll lifter, but may be a lower cost overall since fewer total roll movers are needed. In this embodiment, the rolls in the storage assembly may be arranged vertically or staggered vertically and horizontally as desired.

In an alternate embodiment, the roll lifter may be omitted, and the function of moving rolls between the machine and the storage location(s) may be performed using an overhead crane. In this embodiment, the same crane that is used to remove rolls from the converting line for use outside the converting line may be used to exchange rolls within the converting line. Roll exchange within the converting line requiring only vertical movement makes using even a manually operated crane feasible and safe.

The roll handling assembly provides benefits in that it is compact and requires no additional floor space. Accordingly, it is retrofittable to existing converting lines, and all of the original converting line equipment may remain in its original location with no significant alteration. The storage assembly is scalable. As few as one roll storage location and up to five or more storage locations may be provided, the limits being the height and the weight capacity of the support structure and storage assembly. The storage assembly above the machine provides the advantage of less risk of contamination from fiber and adhesive when compared to conventional systems that store the rolls in or below the machine. The storage assembly may be provided with air blasts to periodically remove any fiber or dust that has settled on the rolls. With the storage assembly above the machine, rolls are more easily accessed, for instance, for removal from the converting line to be installed in another converting line. For instance, a facility general purpose crane may be used to access a roll in the storage assembly by actuating the roll mover of a specific rack to move to the extended position. Such operations may occur without interrupting normal machine operations. The roll movers may be identical to the roll extractors used in the machine to provide simpler construction. Further, each roll in the embosser may be changed including the upper embossing roll and the lower embossing roll.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A roll handling assembly for a roll used on a machine in a converting line, the roll handling assembly comprising:

a storage assembly, the storage assembly comprising a storage structure, the storage structure extending above the machine that uses the roll, the storage assembly comprising a rack adapted and configured to support the roll to be used in the machine, the rack having a roll mover, the roll mover being adapted and configured to move horizontally between a stored position and an extended position; and a transfer assembly, the transfer assembly having first and second supports on laterally opposite sides of the converting line, the first and second supports being adjacent to and extending above the machine that uses the roll, the transfer assembly having a lifter, the lifter being operatively connected to and supported by the first and second supports, the lifter being adapted and configured to move vertically relative to the first and second supports between the storage assembly and the machine, the lifter being movable relative to the first and second supports in only a vertical plane path of motion that intersects the roll mover when the roll mover is in the extended position, the transfer assembly being configured to transfer the roll to be used in the machine between the rack in the storage structure and the machine.

2. The roll handling assembly of claim 1 wherein the lifter is adapted to engage axial ends of the roll when the roll mover is in the extended position.

3. The roll handling assembly of claim 1 wherein the rack is one of a plurality of racks in the storage structure arranged vertically relative to another rack in the plurality of racks.

4. The roll handling assembly of claim 1 wherein the rack is one of a plurality of racks in the storage structure arranged horizontally relative to another rack in the plurality of racks.

5. The roll handling assembly of claim 1 wherein the roll mover has an end effector adapted and configured to engage an axial end of the roll to be stored in the storage structure.

6. The roll handling assembly of claim 1 wherein the roll mover comprises an actuator to move the roll mover between the stored and extended positions.

7. The roll handling assembly of claim 1 wherein the lifter comprises a first cradle associated with the first support, and a second cradle associated with the second support.

8. The roll handling assembly of claim 7 wherein the first cradle is driven with an actuator operatively connected with the first support.

9. The roll handling assembly of claim 7 wherein the second cradle is driven with an actuator operatively connected with the second support.

10. A method of handling a roll used on a machine in a converting line, the method comprising:

moving a lifter operatively supported on first and second supports vertically so as to position the lifter adjacent to a rack of a storage structure of a storage assembly, wherein a roll to be used in the machine is stored in the rack, the first and second supports are on laterally opposite sides of the converting line and the first and second supports are adjacent to and extend above the machine that uses the roll;

moving a roll mover of the rack horizontally from a storage position to an extended position;

transferring the roll from the roll mover to the lifter;

moving the roll mover from the extended position to the storage position;

moving the lifter out of the storage assembly to the machine; and transferring the roll from the lifter to the machine;

wherein the step of moving the lifter vertically includes moving the lifter only in a vertical plane path of motion that intersects the roll mover when the roll mover is in the extended position.

11. The method of claim 10 wherein step of transferring the roll from the roll mover to the lifter includes engaging the roll with the lifter and moving the lifter vertically upward with the roll engaged in the lifter to separate the roll from the roll mover.

12. The method of claim 11 wherein:

the roll mover has an end effector that engages an axial end of the roll; and the step moving the lifter vertically upward with the roll engaged in the lifter to separate the roll from the roll mover includes separating the axial end of the roll from the end effector of the roll mover.

13. The method of claim 11 wherein:

the lifter comprises a first cradle associated with the first support, and a second cradle associated with the second support; and the step moving the lifter vertically upward with the roll engaged in the lifter to separate the roll from the roll mover includes lifting the roll with the first and second cradles.

14. The method of claim 10 wherein:

the rack is one of a plurality of racks in the storage structure arranged vertically relative to another rack in the plurality of racks; and the roll to be used in the machine is stored in at least one of the plurality of racks.

15. The method of claim 10 wherein:

the rack is one of a plurality of racks in the storage structure arranged horizontally relative to another rack in the plurality of racks, and the roll to be used in the machine is stored in at least one of the plurality of racks.

16. The method of claim 10 further comprising:

moving the lifter on the first and second supports to the machine;

transferring a preceding roll from the machine to the lifter;

moving the lifter on first and second supports into the storage assembly adjacent the rack to receive the preceding roll;

moving the roll mover of the rack horizontally from the storage position to the extended position;

transferring the preceding roll from the lifter to the roll mover; and moving the roll mover from the extended position to the storage position.

17. The method of claim 16 wherein the step of transferring the preceding roll from the lifter to the roll mover includes engaging the preceding roll with the roll mover and moving the lifter vertically downward with the preceding roll engaged in the roll mover to separate the preceding roll from the lifter.

18. The method of claim 17 wherein step of engaging the preceding roll with the roll mover includes engaging an axial end of the preceding roll with an end effector of the roll mover.

19. The method of claim 17 wherein the lifter comprises a first cradle associated with the first support, and a second cradle associated with the second support; and the step moving the lifter vertically downward with the preceding roll engaged in the roll mover to separate the preceding roll from the lifter includes disengaging the first and second cradles from the roll.

* * * * *